May 4, 1954  J. F. MEISSNER ET AL  2,677,455
ELEVATOR FOR SHIP-UNLOADERS
Filed Dec. 6, 1950  7 Sheets-Sheet 1

INVENTORS:
John F. Meissner
Charles C. Walsh
By: Brown, Jackson, Boettcher + Dienner
Attys.

Patented May 4, 1954

2,677,455

UNITED STATES PATENT OFFICE 2,677,455

ELEVATOR FOR SHIP-UNLOADERS

John F. Meissner, La Grange, Ill., and Charles C. Walsh, Detroit, Mich.; said Walsh assignor to said Meissner Application December 6, 1950, Serial No. 199,544

8 Claims. (Cl. 198—150)

This invention relates to conveyors, and has to do with large capacity conveyors for handling large quantities of bulk materials such as crushed limestone, gypsum, ore, coal and the like.

Large capacity conveyors are used in many large crushing plants and in ship-unloaders, and for analogous purposes requiring the handling of materials in large volume. The conveyor of our invention is, in certain of its aspects, particularly suitable for use in ship-unloaders, and we shall describe it as so used, by way of example, it being understood that, within the broader concept of our invention, it may be used wherever desirable, particularly in the handling of bulk materials in large volume.

In self unloader vessels, the material is discharged from the hopper bottoms onto the hold conveyors, which deliver the material to the elevator. The elevator extends upward from the tank top of the vessel at a steep incline, usually for a distance of about seventy-five feet, and delivers the material to the boom conveyor on the spar deck of the vessel. The boom conveyor is operated in a known manner and delivers the material to stock piles or storage bins on the dock. The hold conveyors and the boom conveyor can be increased in capacity by increasing the size or the speed of operation thereof, or both, but the elevator as presently constructed can not be increased in capacity, as will be explained more fully presently. The average maximum capacity of the elevators of ship-unloaders is approximately twenty five hundred tons of crushed stone or similar material per hour, which means that the maximum capacity of the ship-unloader is limited by the elevator to approximately twenty-five hundred tons per hour. The space available for the elevator is quite restricted, for which reason it is not feasible to appreciably increase its size. Further, due to the construction of elevators presently used in ship-unloaders, the permissible safe speed of operation thereof is limited to a maximum of approximately one hundred linear feet per minute. Accordingly, the capacity of the elevator can not be appreciably increased by increasing its speed and the maximum capacity of the ship-unloader is determined by the elevator which, as noted, is limited to a maximum of approximately twenty five hundred tons per hour.

In ship-unloader elevators as presently constructed, the buckets are approximately eight feet wide and thirty inches long, that is, in the direction lengthwise of the conveyor. The sides of the buckets are secured to chain links in the form of flat steel bars about seven inches wide and one-half inch thick pivoted together at their ends on thirty inch centers and providing endless chains which pass about the head and tail sprocket wheels of the conveyor. The pivot pins connecting the links of the chains provide stub shafts on which are mounted flanged wheels or rollers about ten inches in diameter which travel on guide rails or tracks and which are engaged by the teeth of the sprocket wheels for propelling the chains and the buckets carried thereby, the links of the chains being thus pivoted together on thirty inch pitch centers. During travel of the loaded buckets up the forward run of the elevator, the wheels or rollers and the chain links and the buckets have rectilineal travel. When a bucket reaches the head of the elevator, the wheels thereof are engaged by the teeth of the head sprocket wheels around which the bucket is moved into dumping position. During the first portion of the movement of the bucket into dumping position, the rectilineal travel of the rollers and the adjacent chain links is converted to arcuate travel, the wheels or rollers travelling through an arc subtended by the links as cords thereof. The rate of travel of the wheels and the bucket incurs positive acceleration during the travel thereof through the first half of the arc and negative acceleration during travel through the remaining half of the arc. Further, during movement of the bucket into dumping position the wheels thereof pass off of the rails and the head sprocket wheels carry the load of the bucket and, to considerable extent, the load of adjacent loaded buckets travelling upward on the conveyor, and each wheel of the bucket takes one half of the total H. P. pull of the conveyor or elevator. Due to the positive and negative acceleration in speed of travel of the buckets into dumping position, and the carrying of the loaded buckets by the head sprocket wheels, considerable impact forces are produced and pulsations of the chain and bucket assembly of the conveyor occur. If the elevator is operated at speeds in excess of approximately one hundred linear feet per minute, the pounding and vibration becomes so great that there is risk of wrecking the elevator. Accordingly, it is not feasible to increase the capacity of the elevators presently used in ship unloaders and the capacity thereof is limited by the elevators, as above noted.

Our invention is directed to a conveyor which may be used to advantage as an elevator in ship unloaders and elsewhere for lifting bulk materials and, when so used, is capable of materially increasing the capacity thereof. To that end, we provide an elevator in which the buckets are 2,677,455

3 transported by means of continuous flexible tension members which pass about the sprocket wheels so that no appreciable acceleration either positive or negative, occurs in the rate of travel of the buckets, the load of the buckets being taken at all times by guide rails so that impact or pounding due to raising or lowering of the buckets by the sprocket wheels is avoided. In the conveyor of our invention the buckets are attached to the flexible tension members by clamps secured on the tension members and receiving cross shafts which carry the buckets, there being rollers or wheels mounted on the cross shafts and traveling on guide rails on the conveyor frame so as to at all times support the load of the buckets. The clamps, in addition to providing means for attaching the cross shafts to the flexible tension members also are suitably disposed and formed to provide, in effect, tooth members adapted to engage in the pockets between the teeth of the sprocket wheels for driving the flexible tension members. The flexible tension members engage in grooves in the sprocket wheels and supplement the tooth members in establishing driving connection between the tension members and the sprocket wheels. Further, the buckets are so mounted on the cross shafts as to permit their being removed and replaced with expedition and facility, which is an important feature of our invention. The connections between the buckets and the cross shafts are such that relative movement of the buckets incident to stretching of the tension members and to travel of the buckets about the sprocket wheels is accommodated. We also provide means whereby the sprocket wheels, particularly the tail sprocket wheels, may be adjusted to accommodate changes in the spacing of the clamps, due to inaccuracies of attachment, stretching of the tension members, or other causes. A further advantage of our invention resides in disposing the tension members inward of the supporting wheels whereby ready access is had to the latter and the guide rails may be effectively supported, particularly those portions thereof extending about the sprocket wheels. Further objects and advantages of our invention will appear from the detailed description.

In the drawings:

Figure 6 is a side view, on an enlarged scale,

4 of one of the end clamps for securing the ends of the cables, the latter being shown fragmentarily and the cross shaft for the bucket being shown in section;

Figure 7 is a fragmentary sectional view, on an enlarged scale, taken substantially on line 7—7 of Figure 6, showing the condition of the cable before the clamp has been pulled up tight;

Figure 8 is a view similar to Figure 7, but after the clamp has been tightened on the cable;

Figure 1:
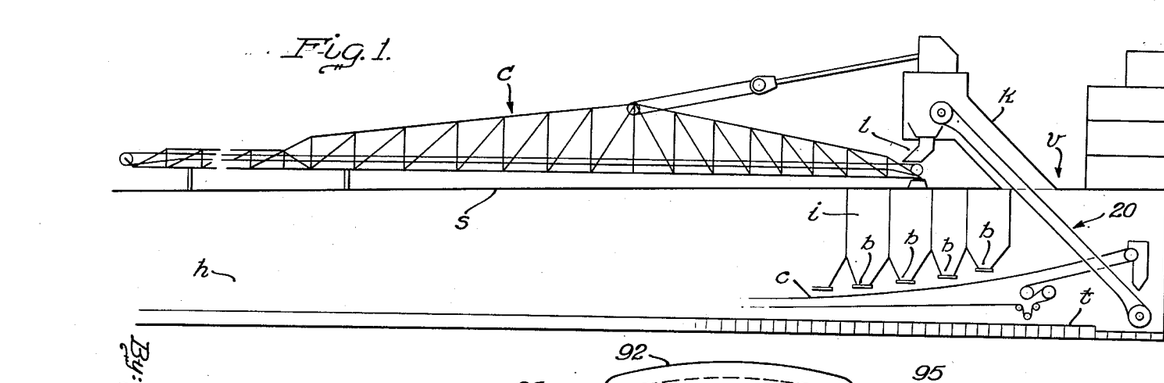
Figure 1 is a semi-diagrammatic view, partly in section and partly in elevation, of a ship unloader embodying the elevator of our invention, as incorporated in a ship, the latter being shown fragmentarily.

In Figure 1 we have shown, diagrammatically, a portion of hull $h$ of a self unloader vessel $v$ having hoppers $i$ with bottoms $b$ through which the material is discharged onto a hold conveyor $c$. As is known, there are usually two sets or series of hoppers $i$ and two hold conveyors $c$. The hold conveyors $c$ deliver the material to an elevator 20 extending upward from the tank top $t$ at an inclination into a housing $k$, extending above the spar deck $s$ of hull $h$. The material discharged by elevator 20 into the housing $k$ is delivered from the latter, through a chute $l$ onto a boom conveyor C normally supported on the spar deck $s$ in a known manner. Suitable known means is provided for driving the boom conveyor C and swinging it into outboard position for discharging the material onto stock piles or into storage bins at the dock. Also, the hold conveyors $c$ are driven in known manner and the hopper bottoms $b$ are provided with gates and operating means therefor, of known type, for controlling discharge of the material therefrom.

Figures 2, 10:
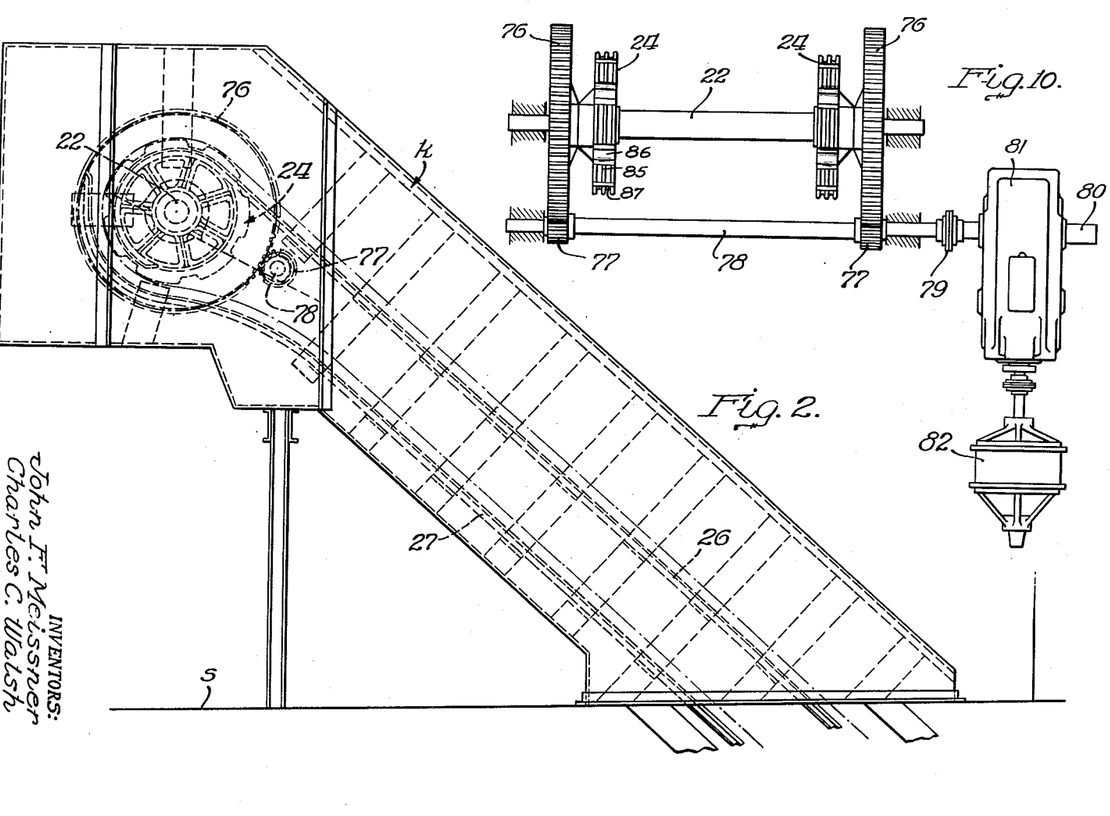
Figures 2 and 2A together constitute a semi-diagrammatic side view of the elevator of our invention and associated parts, certain parts being shown in section and other parts being omitted for clearness of illustration.
Figure 10 is a plan view, on an enlarged scale, of the drive for the elevator head sprockets.
Figure 2A:
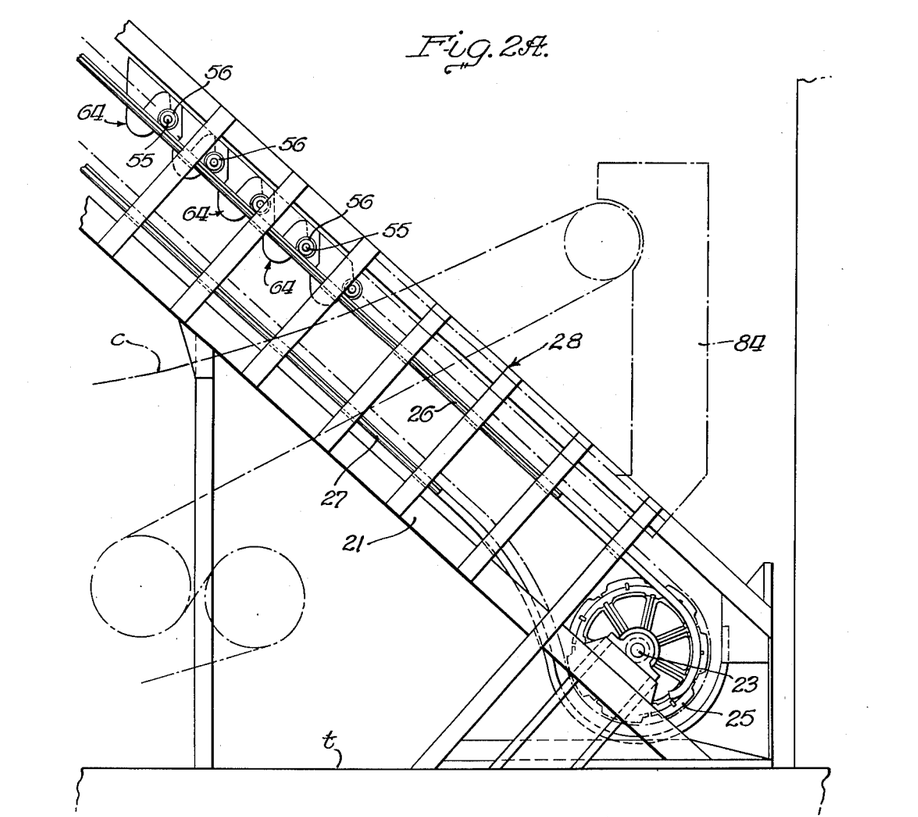

The conveyor 20 comprises a suitable frame 21 on which is rotatably mounted, at the upper and the lower ends thereof, transversely extending head and tail shafts 22 and 23, respectively. Head sprocket wheels 24 are secured on shaft 22 and tail sprocket wheels 25 are mounted on shaft 23, one fixed thereto and the other rotatable thereon. Upper and lower guide rails 26 and 27, respectively, are mounted on frame 21 adjacent the sides thereof, conveniently by means of suitably disposed brackets secured to the frame 21. The end portions of the guide rails 26 and 27 extend about the sprocket wheels 24 and 25 substantially concentric therewith, as shown in Figures 2 and 2A, such end portions of rails 27 being spaced a greater distance radially from the sprocket wheels than the end portions of the rails 26, for a reason which will appear more fully presently. Conveniently, the lower portion of conveyor 20, below the spar deck $s$, is enclosed within a housing 28 mounted on frame 21 and forming a continuation of the housing $k$.

Figures 6, 7, 8:
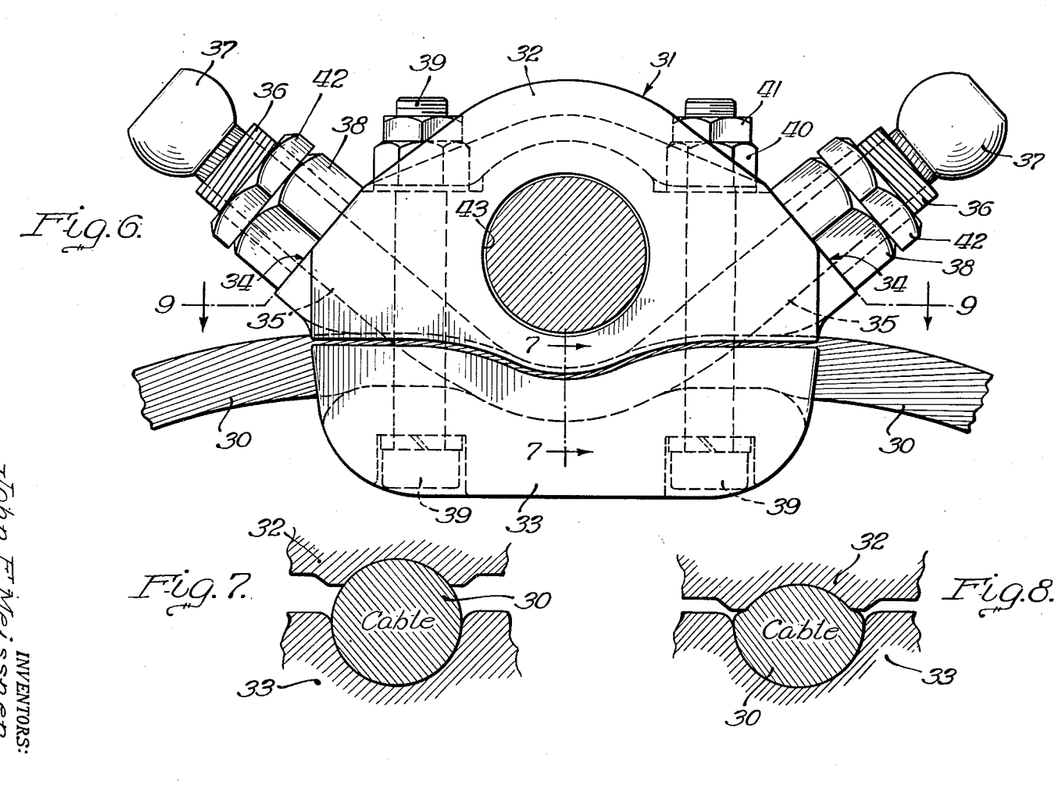

The sprocket wheels 24 and 25 receive tension members 30 passed thereabout. These tension members 30 are in the form of wire ropes or cables and, as shown, are arranged in pairs, one pair at each side of the conveyor. Obviously, the number of cables may be varied to suit requirements. In some cases but one cable may be used at each side of the conveyor, and in other cases three or more cables may be used at each side. It is assumed, for purposes of description, that two cables are used at each side, as stated. The ends of each pair of cables 30 are secured together by a securing clamp 31, shown in Figures 3 and 6. Clamp 31 comprises an outer block 32 and an opposed inner block 33. The blocks 32 and 33 are provided in opposed faces with grooves for receiving the end portions of the cables 30, these grooves being arched inwardly at their midportions, as shown in Figure 6. The cable receiving grooves in the opposed faces of the blocks 32 and 33 are also offset laterally from each other so that the end portions of the cables in such grooves clear each other. The block 31 is further provided, at the front and the back thereof, with flat surfaces or seats 34 through which open bores extending from the cable receiving grooves in the inner face of block 32. The cable ends are inserted through the bores 35 just referred to and through exteriorly threaded nipples 36 of known type secured on the cable ends adjacent knobs 37 formed on the ends of the cables in a known manner. Securing and tensioning nuts 38 are threaded on nipples 36 and seat against the flat surfaces or seats 34 of block 32. The nuts 38 and nipples 36 provide means for forcing the cable ends through the bores 35 of block 32 for securing the cable ends thereto under appropriate tension. The blocks 32 and 33 are forced toward each other by suitably disposed bolts 39 passing therethrough receiving at their upper ends nuts 40 seating on block 32, jam nuts 41 being also threaded on the bolts 39 in tight contact with nuts 40 to guard against looseness thereof. Likewise, jam nuts 42 are threaded on the nipples 36 in tight contact with the nuts 38 to guard against looseness thereof. Before the clamp blocks 32 and 33 have been tightened on the cables 30, the latter appears substantially as shown in Figure 7. When the blocks 32 and 33 have been drawn tightly together, the cable 30 is flattened and distorted and appears as in Figure 8, the end portions of the cable being then tightly gripped between the blocks 32 and 33 and each of the cables 30 then constituting a flexible continuous one-piece tension member which passes about the head and the tail sprocket wheels and in so doing conforms to the curvature thereof, as will appear more fully later. The outer block 32 of clamp 31 is provided with a transverse bore 43 therethrough, for a purpose which will appear presently.

Figure 3:
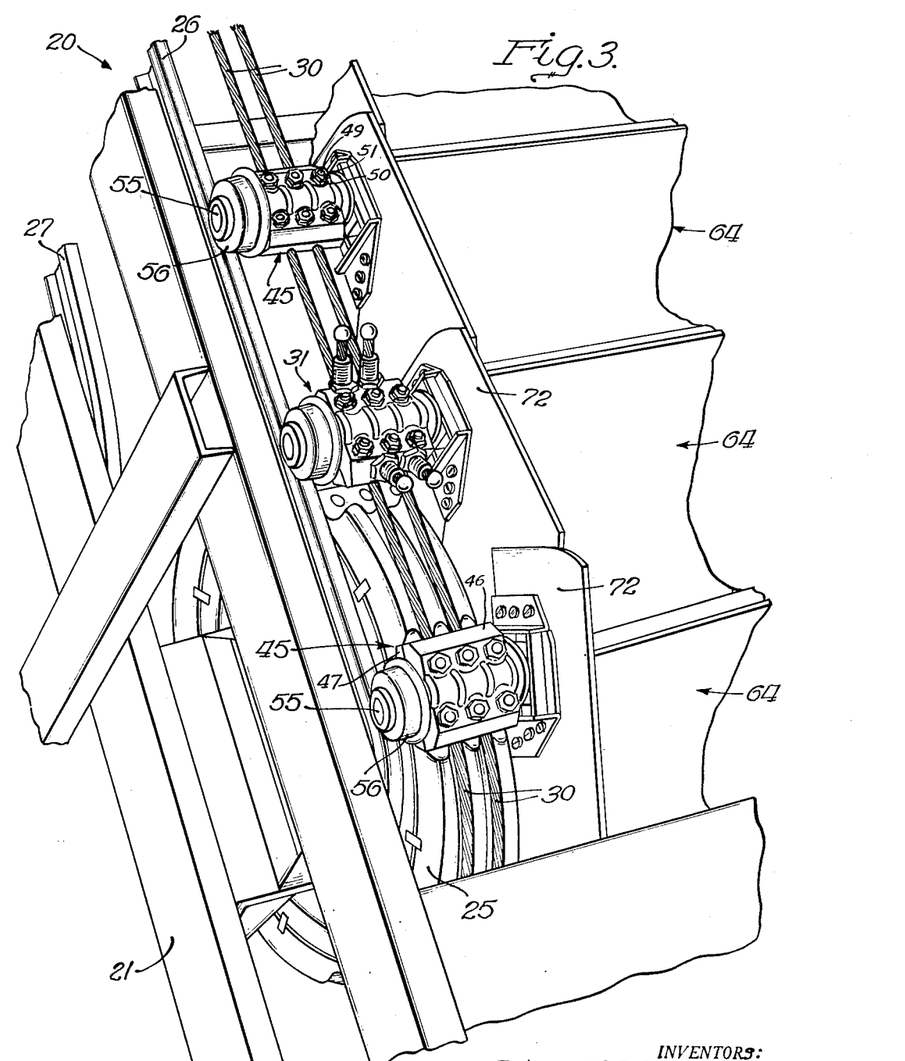
Figure 3 is a fragmentary isometric side view of the elevator of our invention, certain parts being broken away and other parts being omitted for clearness of illustration, this view being on an enlarged scale.
Figure 4:
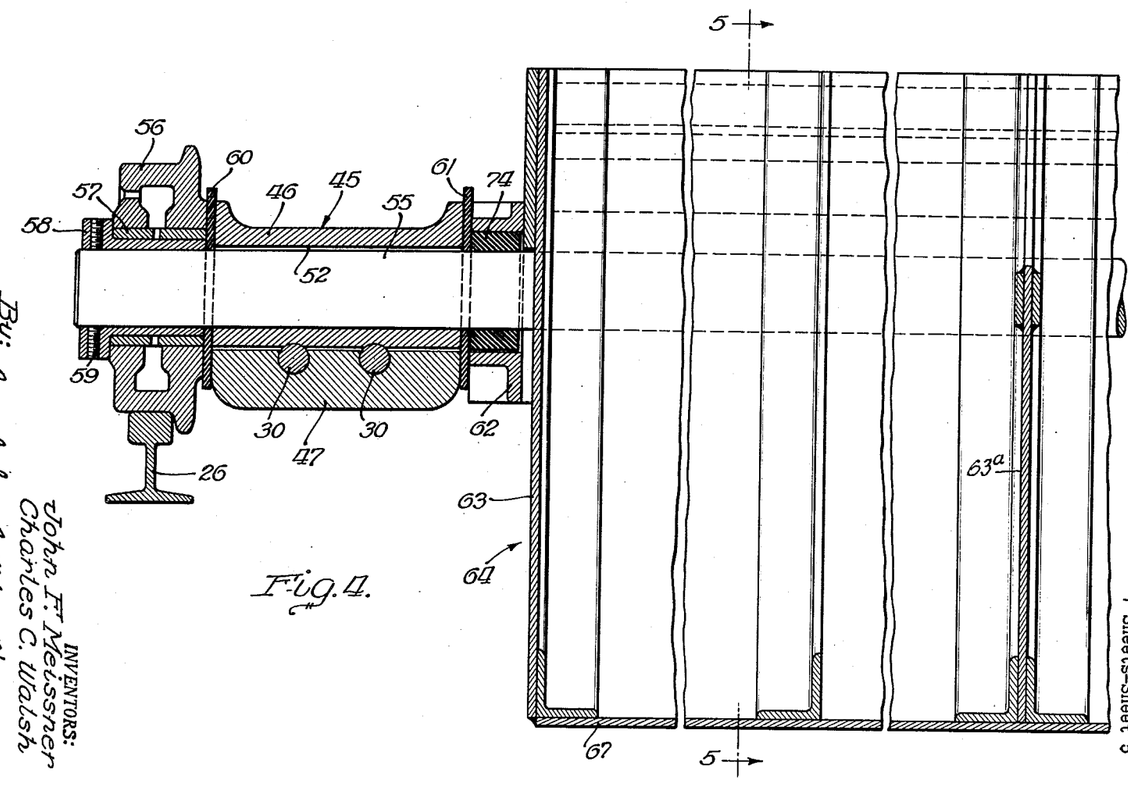
Figure 4 is a sectional view of one of the buckets, on an enlarged scale, taken substantially on line 4—4 of Figure 5, this view also showing, partly in section and partly in elevation, the cross shaft attached to the back wall of the next preceding bucket and the clamp and the load supporting wheel on this cross shaft, and associated parts.

The cables 30 at each side of the elevator 20 are further connected together by supporting clamps 45, shown in Figure 3. Each of the supporting clamps 45 comprises an outer block 46 and an inner block 47 provided in their opposed faces with suitably disposed grooves which receive the cables 30, the central portions of such grooves being offset inwardly to assure tight gripping and tensioning of the cables 30. The blocks 46 and 47 are forced toward each other into tight clamping engagement with the cables 30 by bolts 49 passing therethrough receiving on their upper end portions nuts 50 seating on the blocks 46, and jam nuts 51 seating on nuts 50. Block 46 of the respective clamps 45 is provided with a transverse bore 52. The supporting clamps 45, like the securing clamps 31, bridge the space between the two cables 30 at each side of the conveyor 20, as will be understood. The blocks 33 of clamps 31 and the blocks 47 of clamps 45 are of appropriate size and shape to engage into the pockets of the head and the tail sprocket wheels of the elevator, so as to be engaged by the teeth thereof for propelling the pairs of cables 30 at the sides of the elevator. The clamps 31 and 45 are disposed in pairs aligned transversely of the elevator and are appropriately spaced lengthwise of the cables 30 for engagement by the teeth of the head and the tail sprocket wheels, as will be understood. Cross shafts 55 extend through the bores 43 in blocks 32 of the securing clamps 31 and through the bores 52 in the outer blocks 46 of the supporting clamps 45. The shafts 55 are of slightly less diameter than the bores in the clamp blocks to accommodate any slight misalignment of parts and to assure that the load of the loaded bucket traveling along the upper run of the elevator will be taken by the upper rails 26 thereof. The cross shafts 55 extend outward beyond the respective clamps, as shown more clearly in Figures 3 and 4 and receive, on their outer end portions, flanged wheels 56, of suitable known type, rotatably mounted thereon and traveling on the guide rails 26 and 27. A steel bushing 57 is mounted in each wheel 56 and receives a flanged bronze bushing 58 fixed on cross shaft 55 by set screws 59, or in other suitable manner. A washer 60, preferably formed of rubber impregnated with graphite, is confined between wheel 56 and the outer side of the associated clamp, a similar washer 61 being confined between the inner side of the clamp and a housing 62 bolted to side wall 63 of bucket 64, of suitable construction. It will be understood, from what has been said, that the bucket 64, in cooperation with the housings 62 and the clamp and associated parts, provide means restraining the wheels 56 against movement lengthwise of the cross shafts 55, thereby maintaining them in proper spaced relation for travel on the rails 26 and 27.

Figure 5:
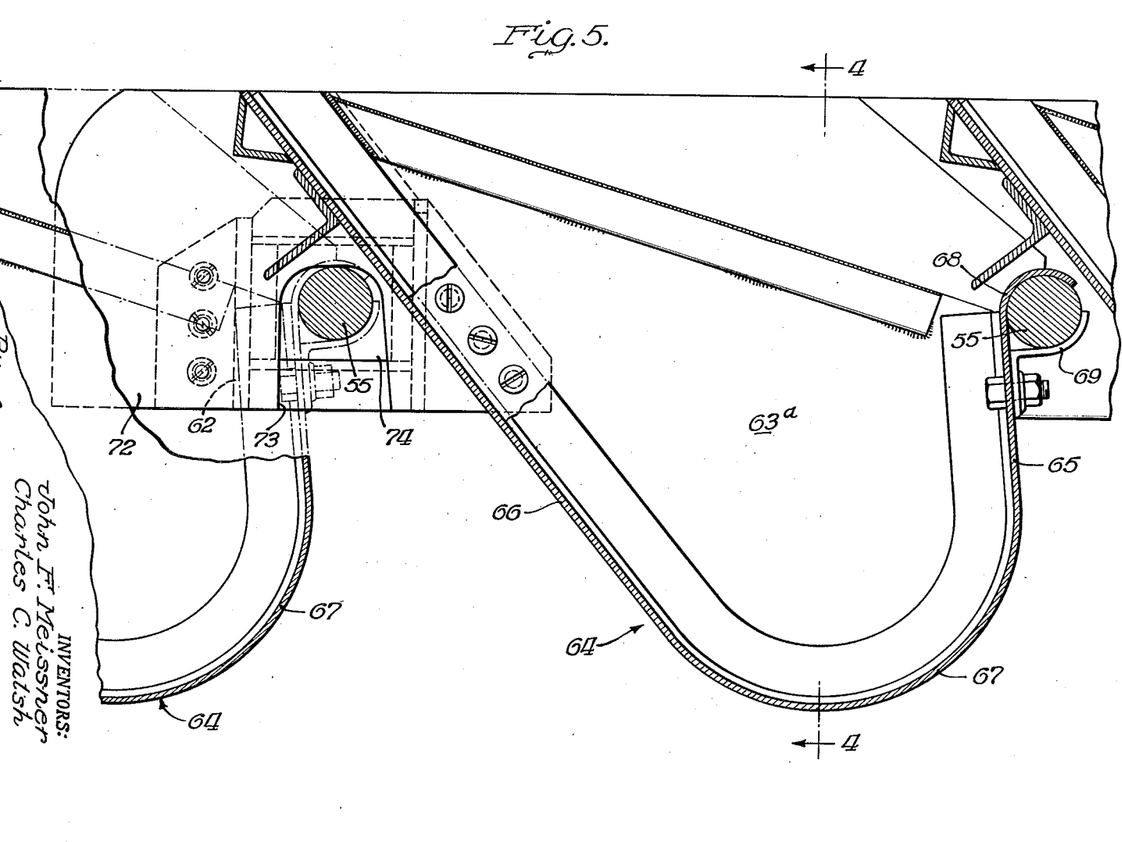
Figure 5 is a sectional view, taken substantially on line 5—5 of Figure 4, of one of the elevator buckets and portions of adjacent buckets, on a reduced scale.

Each of the buckets 64 is of generally triangular shape in transverse section from front to back thereof, as shown more clearly in Figure 5, and comprises the side walls 63, a stiffening web plate 63a between the side walls 63, a flat back wall 65 and a front wall 66 also flat and connected by an arcuate element 67 to the back wall 65. The bucket 64 is appropriately braced by suitably disposed angle members welded or otherwise suitably secured thereto. The front wall 66 of each bucket is inclined inwardly of the elevator away from the back wall 65 of the next adjacent bucket 64. By the front wall of the bucket we mean the leading wall thereof in the travel of the bucket upwardly along the upper side of the elevator, and by the back wall of the bucket we mean the following wall thereof when traveling upward along the elevator. The cross shafts 55 extend between the front and back walls 66 and 65 of adjacent buckets 64, in proximity to the upper portion of the back wall 65 of the respective buckets. The upper portion of back wall 65 of each bucket 64 is turned over to provide a hook element 68 which engages over the corresponding cross shaft 55. Suitably shaped clips 69 are bolted to back wall 65 of bucket 64 and engage about cross shaft 55 at the opposite side thereof from the hook element 68. In that manner, the back wall 65 of the bucket is attached to cross shaft 55 for travel therewith and for turning movement thereabout.

Side plates 72 are suitably secured, conveniently by welding, to the side walls 63 of the respective buckets and project forwardly therefrom in overlapping relation to the side walls of the next preceding bucket. The plates 72 are provided with downwardly opening slots 73 therein of materially greater extent than the cross sectional area of the cross shaft 55 passing therethrough. The housing 62 is bolted to plate 72 and is open at its inner and its outer sides. A shoe 74, preferably formed of rubber impregnated with graphite, is slidably and loosely mounted within housing 62 and fits about cross shaft 55. The front wall 66 of each of the buckets 64 is thus connected to the adjacent cross shaft 55 for travel therewith and for movement relative thereto, to accommodate movement of the buckets about the head and tail sprocket wheels of the elevator, as well as movement of the buckets toward and away from each other due to stretching and contraction of the cables 30, as will appear more fully later. From what has been said, it will be seen that by removing the clips 69 and releasing the housings 62, the buckets 64 may be individually removed and replaced without disturbing other parts of the elevator, which is a distinct advantage in effecting saving of time and work in repairing or replacing the buckets of the elevator. Further, it will be noted that the supporting wheels 56 are disposed outward of the cables and the associated clamps, which permits supporting of the curved end portions of the rails 26 and 27 by brackets secured to the elevator frame and extending inward therefrom to the rails, which is advantageous in facilitating mounting thereof.

The head shaft 22 may be driven in any suitable manner. Conveniently, two spur gear wheels 76 (Figure 10) are secured on shaft 22 at the outer sides of head wheels 24. The gears 76 mesh with spur pinions 77 fixed on a counter shaft 78 rotatably mounted on the elevator frame 21 in spaced parallel relation to head shaft 22. The counter shaft 78 is driven, through a suitable coupling 79 to shaft 80 of a speed reducing unit 81 of known type, which unit 81 is driven by an electric motor 82.

The conveyor may be driven from either end, as desired or as circumstances may require. The sprocket wheels at the end which is not driven should be adjustable, as will appear more fully later, and those at the drive end may also be adjustable. It is assumed, for purposes of description, that the conveyor is driven from the head end. Head shaft 22 is driven counterclockwise, as viewed in Figure 2, for pulling the pairs of cables 30 and the buckets 64 upward along the upper tracks 26. As the buckets start upward along the upper run of the elevator 20, they are loaded with material delivered thereto from a receiving hopper 84, indicated in dotted lines in Figure 2A, to which hopper the material is delivered by the hold conveyors c. The loaded buckets traveling up the rails 26 impose a heavy load on the cables 30 effective for stretching the upper run of the latter to appreciable extent. This stretching of the cables by the load being pulled thereby up the upper run of the elevator serves to maintain the clamps spaced apart uniformly. In practice, the cables 30 are placed under appropriate tension when the clamps are initially applied thereto. The teeth 85 of the head sprocket wheels 24 may be fixed and, of course, are appropriately spaced to receive between them the inner blocks of the cable clamps engaging into the pockets 86 between teeth 85, the latter engaging the clamp blocks for propelling the cables as above described. As is shown more clearly in Figure 10, the teeth 85 of the head sheaves 24 are provided with cable receiving grooves 87 extending about the sprocket wheels 24 circumferentially thereof. The cables 30, in their passage about the head sprocket wheels 24, enter the grooves 87 and conform to the curvature of the sprocket wheels. In that manner acceleration, either positive or negative, of the buckets in the travel thereof is practically eliminated thereby avoiding objectionable impacts and vibration. That permits of the elevator being operated at speeds considerably greater than is permissible in the present elevators above referred to, it being noted, in that connection, that in the elevator of our invention the load of the loaded buckets is taken at all times by the rails 26 and at no time by the head sheaves, which do not exert any lifting effect upon the loaded buckets, the cables 30 serving merely as tension members for propelling the buckets along the rails 26. By increasing the speed of operation of the elevator, we render it possible to increase quite substantially the capacity of ship unloaders using the elevator of our invention, as compared to ship unloaders using the present day elevators above mentioned. Entry of the cables 30 into grooves 87 of the sprocket wheels provides driving connection therebetween supplementary to that provided by the clamps and the teeth of the sprocket wheels.

The loaded buckets are dumped at the head of the elevator, as will be clear, the empty buckets returning along the lower run of the elevator. During travel of the buckets 64 about the head sprockets 24 to dumping position, the wheels 56 thereof travel on the curved end portions of rails 26, and as the bucket 64 reaches dumping position wheels 56 pass onto the curved end portions or rails 27. In that manner we assure that the weight of the loaded bucket passing about the sprocket wheels 24 is supported by rails 26, and that the bucket when dumped is supported by rails 27. That relieves the head sprockets 24 of loads other than the pulling load and, as above noted, avoids objectionable impact and pounding. In like manner, when the buckets pass about the tail sheaves, the wheels 56 of the buckets pass from the curved end portions of rails 26 onto the curved end portions of rails 27 so as to be supported thereby and guard against objectionable pounding and impact.

Figure 9:
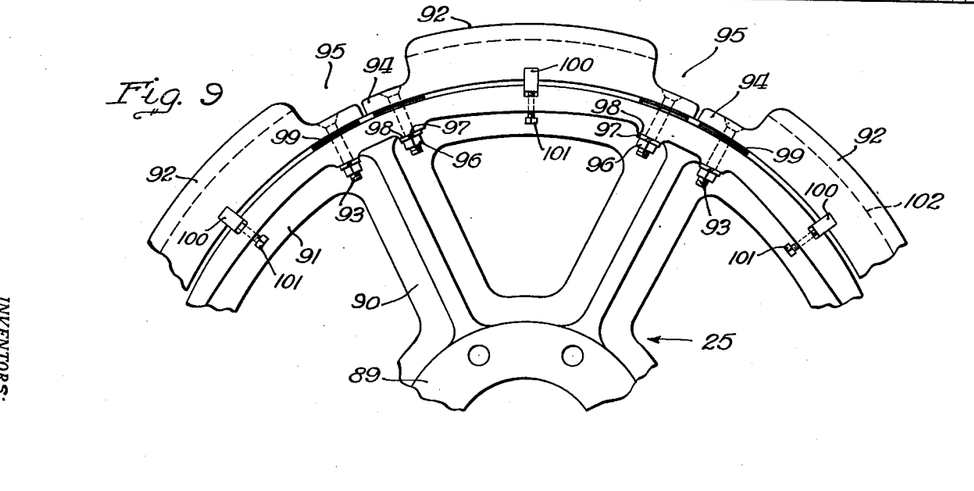
Figure 9 is a fragmentary side view, on an enlarged scale, of one of the elevator tail sprockets.
Figure 11:
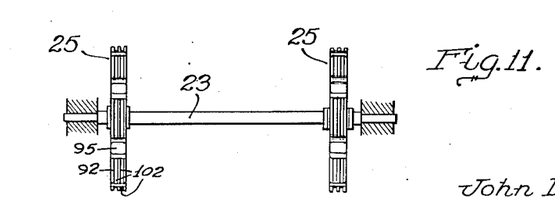
Figure 11 is a plan view, on an enlarged scale, of the elevator tail shaft and the tail sprockets thereon, and associated parts.

When the buckets are dumped the tension of the cables is reduced and the lower runs thereof contract somewhat, thus shortening the distance between the clamps. Accordingly, the clamps passing to the tail sheaves or sprocket wheels 25 are spaced somewhat closer together than the clamps entering the head sprocket wheels 24. In order to accommodate this difference in spacing of the clamps, the tail sprocket wheels 25 are provided with means whereby the teeth thereof may be adjusted radially so as to be spaced properly for receiving the cable clamps from the lower run of the elevator. Referring to Figure 9, each of the tail sprocket wheels 25 comprises a hub 89 connected by radial spokes 90 to a rim 91. Tooth segments 92, approximately conforming to the curvature of rim 91, are secured upon the latter by bolts 93 passing through terminal extensions 94 of the tooth segments 92. The extensions 94 are substantially reduced in radial extent relative to segments 92 and define, with the adjacent ends of segments 92, pockets 95 for reception of the cable clamps. The heads of the bolts 93 are countersunk in the extensions 94 and nuts 96 are threaded upon the inner ends of the bolts and seat against spring washers 97 which seat on seat elements 98 of rim 91. The bolts 93 pass through shims 99 between terminal elements 94 and rim 91. By varying the number or thickness of the shims 99, the tooth segments 92 may be adjusted radially of sprocket wheel 25, for varying the spacing of the teeth thereof and thereby accurately positioning them for reception of the inner blocks of the cable clamps. Keys 100 engage in key ways extending transversely of the respective tooth segments 92 at the mid-length thereof and of rim 91 at the outer face thereof, these keys being secured in position by set screws 101 threaded in the rim 91. The keys 100 take, in large part, the circumferential thrust between the tooth elements 92 and the rim 91, bolts 93 serving in the main to secure the tooth elements 92 against outward radial movement. The tooth elements 92 also are provided with grooves 102 extending circumferentially of the tail sprocket wheel 25, for reception of the cables 30 passing thereabout.

In some cases, after continued use of the elevator, it is possible that the cables 30 may take a permanent stretch such that the cable clamps are spaced slightly further apart than when the cables are tensioned by the loaded buckets traveling up the upper run of the elevator in the manner above described. Accordingly, while the teeth of the head sheaves need not be adjustable in many cases, it is desirable that they be adjustable to take care of excessive stretching of the cables. Accordingly, the head sheaves may be provided with tooth segments mounted thereon for radial adjustment in the same manner as the tooth segments 92 of the tail sprocket wheels 25. Within the broader concept of our invention, any suitable means may be provided for effecting adjustment of the teeth of the sprockets wheels for accommodating variations in spacing of the cable clamps.

It will be understood that changes in detail may be resorted to without departing from the field and scope of our invention, and we intend to include all such variations, as fall within the scope of the appended claims, in this application in which the preferred form only of our invention has been disclosed.

We claim:

1. In a conveyor of the character described having an upper run and a lower run, a pair of head sprocket wheels spaced apart axially, a pair of tail sprocket wheels spaced apart axially, flexible tension members at opposite sides of said conveyor passing about said wheels concentrically therewith, clamps on said members spaced apart lengthwise thereof and disposed and adapted for engagement between the teeth of said wheels, cross shafts carried by said clamps, buckets between said cables bridging the spaces between adjacent cross shafts and respectively having front and back walls and side walls, said cross shafts respectively extending between the front and back walls of adjacent buckets and the front wall of each bucket overlying the back wall of the next preceding bucket at the upper run of said conveyor, said buckets being free from each other for relative movement lengthwise of said conveyor, means mounting the front walls of said buckets on said shafts for relative movement transversely of the latter and lengthwise of said conveyor, and means connecting the back walls of said buckets to said shafts for turning movement about the axes thereof and for travel therewith.

2. In a conveyor of the character described having an upper run and a lower run, a pair of head sprocket wheels spaced apart axially, a pair of tail sprocket wheels spaced apart axially, the teeth of said wheels having in their radially outer faces grooves concentric with the axes of said wheels, flexible tension members at opposite sides of said conveyor passing about said wheels engaging in and conforming to the curvature of said grooves circumferentially of said wheels, clamps on said members spaced apart lengthwise thereof and disposed and adapted for engagement between the teeth of said wheels, cross shafts carried by said clamps, buckets between said tension members bridging the spaces between adjacent cross shafts and respectively having front and back walls and side walls, said cross shafts respectively extending between the front and back walls of adjacent buckets and the front wall of each bucket overlying the back wall of the next preceding bucket at the upper run of said conveyor, said buckets being free from each other for relative movement lengthwise of said conveyor, means slidably connecting the front walls of said buckets to said shafts for relative movement transversely of the latter and lengthwise of said conveyor, and means connecting the back walls of said buckets to said shafts for turning movement about the axes thereof and for travel therewith.

3. In a conveyor of the character described having an upper run and a lower run, a pair of head sprocket wheels spaced apart axially, a pair of tail sprocket wheels spaced apart axially, flexible tension members at opposite sides of said conveyor passing about said wheels concentrically therewith, clamps on said members spaced apart lengthwise thereof and disposed and adapted for engagement between the teeth of said wheels, cross shafts carried by said clamps, buckets between said cables bridging the spaces between adjacent cross shafts and respectively having front and back walls and side walls, said cross shafts respectively extending between the front and back walls of adjacent buckets and the front wall of each bucket overlying the back wall of the next preceding bucket at the upper run of said conveyor, said buckets being free from each other for relative movement lengthwise of said conveyor, said side walls of said buckets having forward extensions provided with openings receiving said shafts and of materially greater extent than the cross section of the latter to accommodate relative rectilineal movement of said buckets transversely of said shafts relative thereto toward and away from each other and lengthwise of said conveyor, and means connecting the back walls of said buckets to said shafts for relative turning movement and far travel therewith.

4. In a conveyor of the character described having an upper run and a lower run, a pair of head sprocket wheels spaced apart axially, a pair of tail sprocket wheels spaced apart axially, flexible tension members at opposite sides of said conveyor passing about said wheels concentrically therewith, clamps on said members spaced apart lengthwise thereof and disposed and adapted for engagement between the teeth of said wheels, cross shafts carried by said clamps, buckets between said cables bridging the spaces between adjacent cross shafts and respectively having front and back walls and side walls, said cross shafts respectively extending between the front and back walls of adjacent buckets and the front wall of each bucket overlying the back wall of the next preceding bucket at the upper run of said conveyor, said side walls of said buckets having forward extensions provided with slots opening through their inner edges, housings removeably secured to said extensions, said shafts passing through said slots and housings and the latter and said slots defining openings of materially greater extent than the cross section of said shafts to accommodate relative movement of said buckets toward and away from each other, and means for connecting the back walls of said buckets to said shafts for relative turning movement and for travel therewith, said means comprising clips engaging about said shafts and removably secured to the back walls of said buckets.

5. In a conveyor of the character described having an upper run and a lower run, a pair of head sprocket wheels spaced apart axially, a pair of tail sprocket wheels spaced apart axially, flexible tension members at opposite sides of said conveyor passing about said wheels concentrically therewith, cross shafts connecting said tension members spaced apart lengthwise thereof, buckets between said tension members respectively bridging the distance between adjacent shafts, and means mounting said buckets on said shafts for travel therewith and for turning movement about the axes thereof and for relative movement of said buckets transversely of said shafts relative thereto and lengthwise of said conveyor to accommodate variations in the linear distance between said shafts during passage of said buckets to and from said sprocket wheels.

6. In a conveyor of the character described having an upper run and a lower run, a pair of head sprocket wheels spaced apart axially, a pair of tail sprocket wheels spaced apart axially, flexible tension members at opposite sides of said conveyor passing about said wheels concentrically therewith, cross shafts connecting said tension members spaced apart lengthwise thereof, buckets between said tension members respectively bridging the distance between adjacent shafts, the front of each bucket overlying the back of the next preceding bucket at the upper run of said conveyor, said buckets being free from each other for relative movement lengthwise of said conveyor, means mounting the front of each bucket on the adjacent cross shaft for turning movement about the axis of said adjacent shaft and for relative movement transversely of said adjacent shaft and lengthwise of said conveyor to accommodate variations in the linear distance between said shafts during passage of said buckets to and from said sprocket wheels, and means mounting the back of each bucket on the adjacent cross shaft for travel therewith and for turning movement about the axis of said shaft adjacent the back of said bucket.

7. In a conveyor of the character described having an upper run and a lower run, a pair of head sprocket wheels spaced apart axially, a pair of tail sprocket wheels spaced apart axially, flexible tension members at opposite sides of said conveyor passing about said wheels concentrically therewith, cross shafts connecting said tension members spaced apart lengthwise thereof, buckets between said tension members respectively bridging the distance between adjacent shafts, the front of each bucket overlying the back of the next preceding bucket at the upper run of said conveyor, said buckets being free from each other for relative movement lengthwise of said conveyor, means mounting the front of each bucket on the adjacent cross shaft for turning movement about the axis of said adjacent shaft and for relative rectilineal movement transversely of said adjacent shaft and lengthwise of said conveyor to accommodate variations in the linear distance between said shafts during passage of said buckets to and from said sprocket wheels, and means mounting the back of each bucket on the adjacent cross shaft for travel therewith and for turning movement about the axis of said shaft adjacent the back of said bucket.

8. In a conveyor of the character described having an upper run and a lower run, a pair of head sprocket wheels spaced apart axially, a pair of tail sprocket wheels spaced apart axially, flexible tension members at opposite sides of said conveyor passing about said wheels concentrically therewith, cross shafts connecting said tension members spaced apart lengthwise thereof, buckets between said tension members respectively bridging the distance between adjacent shafts, the front of each bucket overlying the back of the next preceding bucket at the upper run of said conveyor, said buckets being free from each other for relative movement lengthwise of said conveyor, means slidably mounting the front of each bucket on the adjacent cross shaft for turning movement about the axis of said adjacent shaft and for relative movement transversely of said adjacent shaft and lengthwise of said conveyor to accommodate variations in the linear distance between said shafts during passage of said buckets to and from said sprocket wheels, and means mounting the back of each bucket on the adjacent cross shaft for travel therewith and for turning movement about the axis of said shaft adjacent the back of said bucket.

References Cited in the file of this patent

UNITED STATES PATENTS

| Number | Name | Date |
| --- | --- | --- |
| 432,915 | Toohey | July 22, 1890 |
| 534,808 | Berger | Feb. 26, 1895 |
| 567,683 | Marvel | Sept. 15, 1896 |
| 793,243 | Symes | June 27, 1905 |
| 800,639 | Gegenheimer | Oct. 3, 1905 |
| 818,595 | Wilcox | Apr. 24, 1906 |
| 865,591 | Horst | Sept. 10, 1907 |
| 1,426,179 | Glass | Aug. 15, 1922 |
| 2,204,236 | Shonnard | June 11, 1940 |
| 2,343,585 | Schott | Mar. 7, 1944 |
| 2,356,027 | Boyd et al. | Aug. 15, 1944 |

FOREIGN PATENTS

| Number | Country | Date |
| --- | --- | --- |
| 397,055 | Great Britain | Aug. 17, 1933 |